(12) United States Patent
Sabba et al.

(10) Patent No.: US 11,250,391 B2
(45) Date of Patent: Feb. 15, 2022

(54) TOKEN CHECK OFFLINE

(71) Applicant: VISA INTERNATIONAL SERVICE ASSOCIATION, San Francisco, CA (US)

(72) Inventors: Yaasha Sabba, San Jose, CA (US); Jordan Scheinfield, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 971 days.

(21) Appl. No.: 15/011,366

(22) Filed: Jan. 29, 2016

(65) Prior Publication Data

US 2016/0224977 A1 Aug. 4, 2016

Related U.S. Application Data

(60) Provisional application No. 62/110,291, filed on Jan. 30, 2015.

(51) Int. Cl.
*G06Q 20/04* (2012.01)
*G06Q 20/38* (2012.01)
*G06Q 20/40* (2012.01)

(52) U.S. Cl.
CPC ....... *G06Q 20/0457* (2013.01); *G06Q 20/385* (2013.01); *G06Q 20/4018* (2013.01); *G06Q 2220/00* (2013.01)

(58) Field of Classification Search
CPC ............................................. G06Q 20/00–425
See application file for complete search history.

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

EP 2156397 A1 2/2010
WO 2001035304 A1 5/2001
(Continued)

OTHER PUBLICATIONS

Satoshi Nakamoto, Bitcoin: A Peer-to-Peer Electronic Cash System, Oct. 31, 2008.*

(Continued)

*Primary Examiner* — Mohammad A. Nilforoush
(74) *Attorney, Agent, or Firm* — Kilpatrick Townsend & Stockton

(57) ABSTRACT

Embodiments are directed to a method comprising, obtaining, by a first device, a first token, the first token associated with an amount of funds and a funds availability starting date. After the first token is obtained by the first device, the first device generates a second token linked to the first token and second token generation data. The second token generation data may include evidence that the second token was generated by the first device, and not another device. The second token generation data could be a first device identifier and the second token generation details, or could be a hashed value of the first device identifier and the second token generation details. The method also includes provisioning, by the first device, the second token and the second token generation data to the second device.

24 Claims, 6 Drawing Sheets

(56) References Cited

U.S. PATENT DOCUMENTS

| | | |
|---|---|---|
| 5,883,810 A | 3/1999 | Franklin et al. |
| 5,903,880 A * | 5/1999 | Biffar .................... G06Q 20/06 |
| | | 235/379 |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |

(56) References Cited

U.S. PATENT DOCUMENTS

| | | |
|---|---|---|
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1* | 6/2002 | Rubin ............... G06Q 20/04 705/65 |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0223918 A1 | 9/2008 | Williams et al. |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |

(56) References Cited

U.S. PATENT DOCUMENTS

| | | |
|---|---|---|
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0259782 A1* | 10/2012 | Hammad ............... G06Q 20/12 705/44 |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2012/0330846 A1† | 12/2012 | Light et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0060689 A1* | 3/2013 | Oskolkov ............... G06Q 20/10 705/42 |
| 2013/0081122 A1 | 3/2013 | Svigals et al. |
| 2013/0091028 A1 | 4/2013 | Oder("J. D. "), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |

(56) References Cited

U.S. PATENT DOCUMENTS

| | | | |
|---|---|---|---|
| 2014/0040137 | A1 | 2/2014 | Carlson et al. |
| 2014/0040139 | A1 | 2/2014 | Brudnicki et al. |
| 2014/0040144 | A1 | 2/2014 | Plomske et al. |
| 2014/0040145 | A1 | 2/2014 | Ozvat et al. |
| 2014/0040148 | A1 | 2/2014 | Ozvat et al. |
| 2014/0040628 | A1 | 2/2014 | Fort et al. |
| 2014/0041018 | A1 | 2/2014 | Bomar et al. |
| 2014/0046853 | A1 | 2/2014 | Spies et al. |
| 2014/0047551 | A1 | 2/2014 | Nagasundaram et al. |
| 2014/0052532 | A1 | 2/2014 | Tsai et al. |
| 2014/0052620 | A1 | 2/2014 | Rogers et al. |
| 2014/0052637 | A1 | 2/2014 | Jooste et al. |
| 2014/0068706 | A1 | 3/2014 | Aissi |
| 2014/0074637 | A1 | 3/2014 | Hammad |
| 2014/0081787 | A1* | 3/2014 | Blackhurst ............ G06Q 30/00 705/26.1 |
| 2014/0108172 | A1 | 4/2014 | Weber et al. |
| 2014/0108260 | A1 | 4/2014 | Poole et al. |
| 2014/0108263 | A1* | 4/2014 | Ortiz ................ G06Q 20/322 705/71 |
| 2014/0114857 | A1 | 4/2014 | Griggs et al. |
| 2014/0143137 | A1 | 5/2014 | Carlson |
| 2014/0149285 | A1* | 5/2014 | De .................. G06Q 20/3276 705/41 |
| 2014/0164243 | A1 | 6/2014 | Aabye et al. |
| 2014/0188586 | A1 | 7/2014 | Carpenter et al. |
| 2014/0294701 | A1 | 10/2014 | Dai et al. |
| 2014/0297534 | A1 | 10/2014 | Patterson |
| 2014/0310183 | A1 | 10/2014 | Weber |
| 2014/0330721 | A1 | 11/2014 | Wang |
| 2014/0330722 | A1 | 11/2014 | Laxminarayanan et al. |
| 2014/0331265 | A1 | 11/2014 | Mozell et al. |
| 2014/0337236 | A1 | 11/2014 | Wong et al. |
| 2014/0344153 | A1 | 11/2014 | Raj et al. |
| 2014/0372308 | A1 | 12/2014 | Sheets |
| 2015/0019443 | A1 | 1/2015 | Sheets et al. |
| 2015/0032625 | A1 | 1/2015 | Dill et al. |
| 2015/0032626 | A1 | 1/2015 | Dill et al. |
| 2015/0032627 | A1 | 1/2015 | Dill et al. |
| 2015/0046338 | A1 | 2/2015 | Laxminarayanan et al. |
| 2015/0046339 | A1 | 2/2015 | Wong et al. |
| 2015/0052064 | A1 | 2/2015 | Karpenko et al. |
| 2015/0088756 | A1 | 3/2015 | Makhotin et al. |
| 2015/0106239 | A1 | 4/2015 | Gaddam et al. |
| 2015/0112870 | A1 | 4/2015 | Nagasundaram et al. |
| 2015/0112871 | A1 | 4/2015 | Kumnick |
| 2015/0120472 | A1 | 4/2015 | Aabye et al. |
| 2015/0127529 | A1 | 5/2015 | Makhotin et al. |
| 2015/0127547 | A1 | 5/2015 | Powell et al. |
| 2015/0140960 | A1 | 5/2015 | Powell et al. |
| 2015/0142673 | A1 | 5/2015 | Nelsen et al. |
| 2015/0161597 | A1 | 6/2015 | Subramanian et al. |
| 2015/0178724 | A1 | 6/2015 | Ngo et al. |
| 2015/0180836 | A1 | 6/2015 | Wong et al. |
| 2015/0186864 | A1 | 7/2015 | Jones et al. |
| 2015/0193222 | A1 | 7/2015 | Pirzadeh et al. |
| 2015/0195133 | A1 | 7/2015 | Sheets et al. |
| 2015/0199679 | A1 | 7/2015 | Palanisamy et al. |
| 2015/0199689 | A1 | 7/2015 | Kumnick et al. |
| 2015/0206106 | A1* | 7/2015 | Yago ................ G06Q 20/0658 705/68 |
| 2015/0220917 | A1 | 8/2015 | Aabye et al. |
| 2015/0269566 | A1 | 9/2015 | Gaddam et al. |
| 2015/0312038 | A1 | 10/2015 | Palanisamy |
| 2015/0319158 | A1 | 11/2015 | Kumnick |
| 2015/0332262 | A1 | 11/2015 | Lingappa |
| 2015/0356560 | A1 | 12/2015 | Shastry et al. |
| 2016/0028550 | A1 | 1/2016 | Gaddam et al. |
| 2016/0042263 | A1 | 2/2016 | Gaddam et al. |
| 2016/0065370 | A1 | 3/2016 | Le Saint et al. |
| 2016/0092696 | A1 | 3/2016 | Guglani et al. |
| 2016/0092872 | A1 | 3/2016 | Prakash et al. |
| 2016/0092988 | A1† | 3/2016 | Letourneau |
| 2016/0103675 | A1 | 4/2016 | Aabye et al. |
| 2016/0119296 | A1 | 4/2016 | Laxminarayanan et al. |
| 2016/0224976 | A1 | 8/2016 | Basu |
| 2017/0046696 | A1 | 2/2017 | Powell et al. |
| 2017/0103387 | A1 | 4/2017 | Weber |
| 2017/0220818 | A1 | 8/2017 | Nagasundaram et al. |
| 2017/0228723 | A1 | 8/2017 | Taylor |

FOREIGN PATENT DOCUMENTS

| | | | |
|---|---|---|---|
| WO | 2001035304 A9 | 5/2001 | |
| WO | 2004042536 A2 | 5/2004 | |
| WO | 2006113834 A2 | 10/2006 | |
| WO | 2009032523 A1 | 3/2009 | |
| WO | 2010078522 A1 | 7/2010 | |
| WO | 2012068078 A2 | 5/2012 | |
| WO | 2012098556 A1 | 7/2012 | |
| WO | 2012/123394 A1 | 9/2012 | |
| WO | 2012142370 A2 | 10/2012 | |
| WO | 2012167941 A1 | 12/2012 | |
| WO | 2013048538 A1 | 4/2013 | |
| WO | 2013056104 A1 | 4/2013 | |
| WO | 2013119914 A1 | 8/2013 | |
| WO | 2013179271 A2 | 12/2013 | |

OTHER PUBLICATIONS

Ron White, How Computers Work, Oct. 15, 2003, Que Publishing, 7th Ed. (Year 2003).*

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

Mondex Smart Card, http://www.tech-faq.com/mondex-smart-card.html, Dec. 10, 2015, 3 pages.

Chaum, et al., "Efficient Offline Electronic Checks", Centre for Mathematics and Computer Science, Kruislaan 413, 1098 SJ Amsterdam, The Netherlands, J.J. Quisquater and J. Vandewalle (Eds.): Advances in Cryptology—EUROCRYPT '89, LNCS 434, 1990, pp. 294-301.

Liu et al., "Security and Privacy in the Age of Ubiquitous Computing," Transferable E-Cash Revisit; pp. 172-173 https://books.google.com/books?id=_7zgBwAAQBAJ&pg=PA172&dq=using+echeck+while+offline&hl=en&sa=X&ved=0ahUKEwiU1pWugdDJAhUB2mMKHZgvBd4Q6AEIMDAB#v=onepage&q=using%20echeck%20while%20offline&f=false.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request via Access Device filed Nov. 25, 2015.

Prakash et al., U.S. Appl. No. 14/955,716 (unpublished), Provisioning Platform for Machine-to-Machine Devices filed Dec. 1, 2015.

Wong et al., U.S. Appl. No. 14/966,948 (unpublished), Automated Access Data Provisioning filed Dec. 11, 2015.

(56) References Cited

OTHER PUBLICATIONS

Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.

\* cited by examiner
† cited by third party

TOKEN CHECK OFFLINE

CROSS-REFERENCE TO RELATED APPLICATION

The present application claims the benefit of and priority to U.S. Provisional Application No. 62/110,291, filed on Jan. 30, 2015, the entire contents of which is incorporated herein by reference for all purposes.

BACKGROUND

Advancements in mobile communications devices has made it increasingly easy for users (e.g., consumers) to conduct transactions. To improve data security, tokens have been provisioned to such communication devices instead of real information. For example, payment tokens can be provisioned to mobile communication devices instead of real account numbers to conduct transactions. If the payment token is stolen by an unauthorized person, then the real information is not compromised.

In some instances, a first user may want to transfer funds to a second person. While it can be a relatively straightforward matter for the first person to contact a remote server computer holding the funds to transfer the funds to a second person, it is difficult to do this when tokens are used instead of real information, and it is also difficult to do when the first and second persons are offline and are not connected to the remote server computer.

Embodiments address these and other problems, individually and collectively.

SUMMARY

Embodiments are directed to systems, methods and computer readable media related to generating and provisioning payment tokens from previously generated payment tokens.

Some embodiments are directed to a method comprising, obtaining, by a first device, a first token, the first token associated with an amount of funds and a funds availability starting date. After the first token is obtained by the first device, the first device generates a second token linked to the first token and second token generation data. The second token generation data may include evidence that the second token was generated by the first device, and not another device. The second token generation data could include a first device identifier and the second token generation details, or could alternatively or additionally include a hashed value of the first device identifier and the second token generation details (e.g., the value, conditions, or second device involved in the transfer of the second token to the second device). The method also includes provisioning, by the first device, the second token and the second token generation data to the second device.

One embodiment of the invention is directed to a method comprising: obtaining, by a first device, a first token, the first token; generating, by the first device, a second token linked to the first token and second token generation data; and provisioning, by the first device, the second token and the second token generation data to a second device. The second token generation data is utilized to verify the origin of the generation of the second token.

Another embodiment of the invention is directed to a device. The device comprises: one or more processors; and a memory coupled to the one or more processors, the memory comprising code for causing the one or more processors to implement a method. The method comprises: obtaining a first token, the first token; generating a second token linked to the first token and second token generation data; and provisioning the second token and the second token generation data to a second device. The second token generation data is utilized to verify the origin of the generation of the second token A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
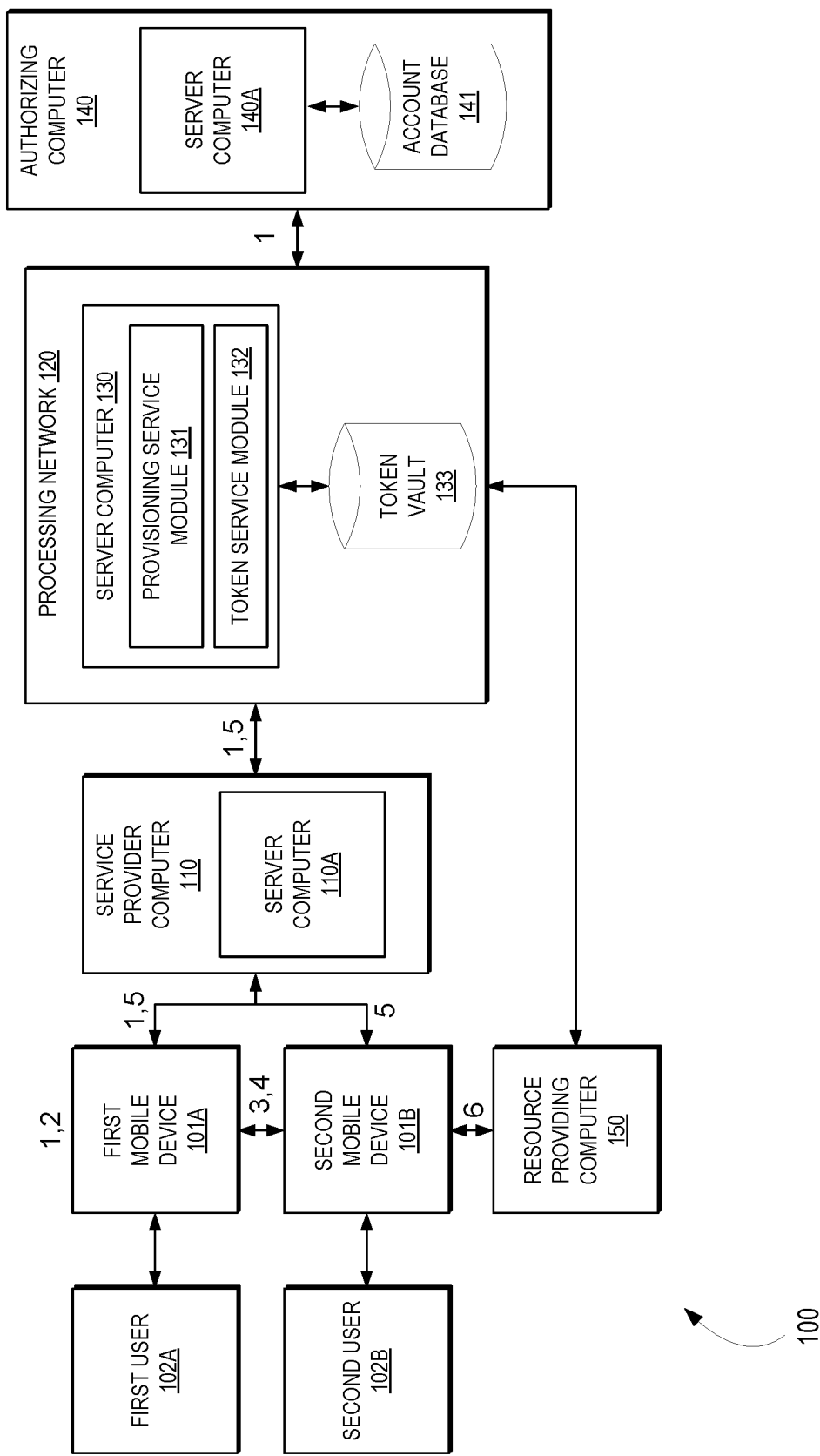
FIG. 1 illustrates a system diagram with a process flow for generating and provisioning a payment token from a first mobile device to a second mobile device using a provisioning system according to an embodiment.

In the following description, for the purposes of explanation, specific details are set forth in order to provide a thorough understanding of the exemplary embodiments. However, it will be apparent that various embodiments may be practiced without these specific details. The figures and description are not intended to be restrictive. For example, although the "tokens" are described in the context of payments in the specific examples discussed below, embodiments of the invention can apply to other contexts which do not involve payments. For example, embodiments of the invention can be used to pass a subset of access rights (e.g., to access a building) that might be present in a first device operated by a first user, to another a second device operated by a second user, so that the second user may access any locations or resources (e.g., online documents) that might be associated with the subset of access rights.

Embodiments may be directed at generating a second payment token from a previously generated first payment token. Embodiments provide for the capability to track the history of the generation and use of the second payment token back to the first payment token. For example, the history can be tracked using a block chain. Embodiments allow for flexibility in the generation and conveyance of payment tokens, as well as allows for verification of the second payment token.

A "token" may be a set of characters that may represent another set of characters. The characters may be in the form of letters, numbers, symbols, etc. Examples of tokens include payment tokens, access tokens, personal identification tokens, etc. A payment token may include an identifier for a payment account that is a substitute for an account identifier, such as a primary account number (PAN). In some embodiments, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

In some embodiments, the second payment token can represent an account, which may in turn represent a specified value amount, that may be optionally valid for a specific valid period. For example, the second payment token may be generated with a value amount of $50, and a user generating the second payment token may specify that the second payment token becomes valid starting on Jan. 20, 2015. Payment of funds using the payment tokens may act like, for example, an electronic or digital check (e.g., electronic version of a paper check) or prepaid card.

These are merely examples, and the amount of the second payment token can vary as desired by a user. A user can include an individual or an entity that uses a system. A user may be associated with one or more accounts and/or user devices. In some cases, the user may also be referred to as an account holder, or consumer.

Further, a period during which the payment token is valid can vary as desired by a user. In the event an account does not have a sufficient amount for issuing a second payment token, when either the first mobile device or the second mobile device goes online, a user of the first mobile device or the second mobile device can be notified that there are insufficient funds for the second payment token.

In some embodiments, the second payment token may be verified and validated using information associated with the mobile device that generated and provisioned the second payment token. In some embodiments, the verification may include sending the details for the second payment token to a wallet provider computer. In other embodiments, the second payment token may be validated by other mobile devices connected to the first mobile and second mobile device through a personal area network connection.

An "account identifier" can include any suitable information associated with an account (e.g. a payment account, a resource access account, etc. and/or a device associated with the account). Such information may be directly related to the account or may be derived from information related to the account. Examples of account information may include an account number (e.g. a primary account number (PAN)), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

A "mobile device" can be a device that can be easily transported. In some embodiments, a mobile device can include any suitable electronic device that may be transported and/or operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, game consoles, etc. Further examples of user devices may also include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Some embodiments may be used in transaction processing systems or may use data generated during transaction processing through a transaction processing system. Such embodiments may involve transactions between users, transactions between users and merchants, and transactions between merchants.

I. Systems

FIG. 1 shows a block diagram of a token provisioning system 100 according to an embodiment. The system 100 includes a first mobile device 101A, a second mobile device 101B, a service provider computer 110 (e.g., a wallet provider computer), a processing network 120 (e.g., a payment processing network), an authorizing computer 140 (e.g., an issuer computer), and a resource providing computer 150 (e.g., a merchant computer). Each of these systems and computers may be in operative communication with each other.

In some embodiments, the first mobile device 101A may be operated by a first user 102A, and the second mobile device 101B may be operated by a second user 102B. In other embodiments, both the first mobile device 101A and the second mobile device 101B may be operated by a single user.

Each of these systems and computers may be in operative communication with each other. For simplicity of illustration, a certain number of components are shown in FIG. 1. It is understood, however, that embodiments may include more than one of each component. In addition, some embodiments may include fewer than or greater than all of the components shown in FIG. 1. In addition, the components in FIG. 1 may communicate via any suitable communication medium (including the Internet), using any suitable communications protocol.

In FIG. 1, each of mobile devices 101A and 101B may include a mobile wallet or payment application that can be provisioned with account information to enable each mobile device to conduct transactions. A mobile wallet may refer to a digital wallet or an e-wallet which is a software application that allows an individual to conduct electronic commerce transactions. A digital wallet may store payment credentials, bank account information, one or more digital wallet identifiers and/or the like and can be used in a variety of transactions, such as but not limited to eCommerce, social networks, money transfer/personal payments, mobile commerce, proximity payments, and/or the like for retail purchases, digital goods purchases, utility payments, transferring funds between users, and/or the like. A digital wallet may be designed to streamline the purchase and payment process. A digital wallet may also store transaction records (e.g., electronic receipts).

The service provider computer 110 may be a wallet provider computer and may comprise a server computer 110A to facilitate the provisioning process. The server computer 110A may include a processor and a computer readable medium coupled to the processor, the computer readable medium comprising code, executable by the processor.

The service provider computer 110 may be operated or associated with an application provider. The application provider may be an entity that provides an application to a mobile device for use by a user. In some embodiments, the application provider can be a wallet provider that provides a mobile wallet or payment application to a mobile device. The service provider computer 110 may maintain one or more digital wallets for each user, and each digital wallet may be associated with payment data for one or more payment accounts. Examples of digital wallets may include Visa Checkout™ or Google™ Wallet, etc. The server computer 110A may send and receive over-the-air (OTA) messages to a mobile wallet application stored on, for example, mobile device 101A and 101B. The service provider server computer 110A may include a processor and a computer readable medium coupled to the processor, the computer readable medium comprising code, executable by the processor for performing the functionality described in further details below.

The processing network 120 may comprise a server computer 130. The server computer 130 may include a processor and a computer readable medium coupled to the processor, the computer readable medium comprising code, executable by the processor.

The processing network 120 may include data processing subsystems, networks, and operations used to support and deliver authorization services, exception file services, and clearing and settlement services. For example, the processing network 120 may comprise a server coupled to a network interface (e.g., by an external communication interface), and databases of information. The processing network 120 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network 120 may use any suitable wired or wireless network, including the Internet.

The processing network 120 may be associated with one or more payment service providers. A payment service provider can offer online services for accepting electronic payment. The processing network 120 may include any entity that provides provisioning or personalization services. For example, the processing network 120 may maintain a personalization database with user information, and the processing network 120 may be configured to communicate with one or more authorizing computers 140 to determine personalized payment data for users. The processing network 120, via a provisioning service module 131, may provide provisioning services to the service provider computer 110, in which the service provider computer 110 may utilize an application programming interface (API) to communicate with the payment processing network server computer 130.

In some embodiments, the processing network 120 may provide additional services, including but not limited to a token service module 132 that can generate and/or provide a "payment token" that is associated with sensitive data (e.g., account information). For example, the token service module 132 may generate a payment token that can be used as a substitute for a real account identifier and maintain a stored association (or mapping) between the payment token and the PAN, such that the token service module 132 is able to "translate" the payment token back to the original PAN.

Token service module 132 can facilitate requesting, determining (e.g., generating) and/or issuing tokens, as well as maintaining an established mapping of tokens to account identifiers such as primary account numbers (PANs) in a repository (e.g. token vault 133). In some embodiments, the token service module 132 may establish a token assurance level for a given token to indicate the confidence level of the token to PAN binding. The token service module may include or be in communication with the token vault 133 where the generated tokens are stored. The token service module may support token processing of transactions submitted using tokens by de-tokenizing the token to obtain the actual PAN. In some embodiments, a token service module may include a tokenization computer alone, or in combination with other computers such the processing network 120.

The use of a payment token instead of a real account identifier during a transaction can improve data security. In some embodiments, the payment token and/or information regarding the payment token may be stored in a token vault 133 (e.g., a storage location, such as a data store, configured to store tokens).

The authorizing computer 140 may comprise a server computer 140A and an account database 141. The server computer 140A may include a processor and a computer readable medium coupled to the processor, the computer readable medium comprising code, executable by the processor. In some embodiments, the authorizing computer 140 may communicate with the processing network 120 to provide authentication processes and account information associated with accounts of users, such an account of the first user 102A. The account information can be stored in account database 141. The account database 141 can store account information for a plurality of accounts and for a plurality of users. Further, the account database can store information regarding an account and a corresponding payment token issued for the account.

Figure 2:
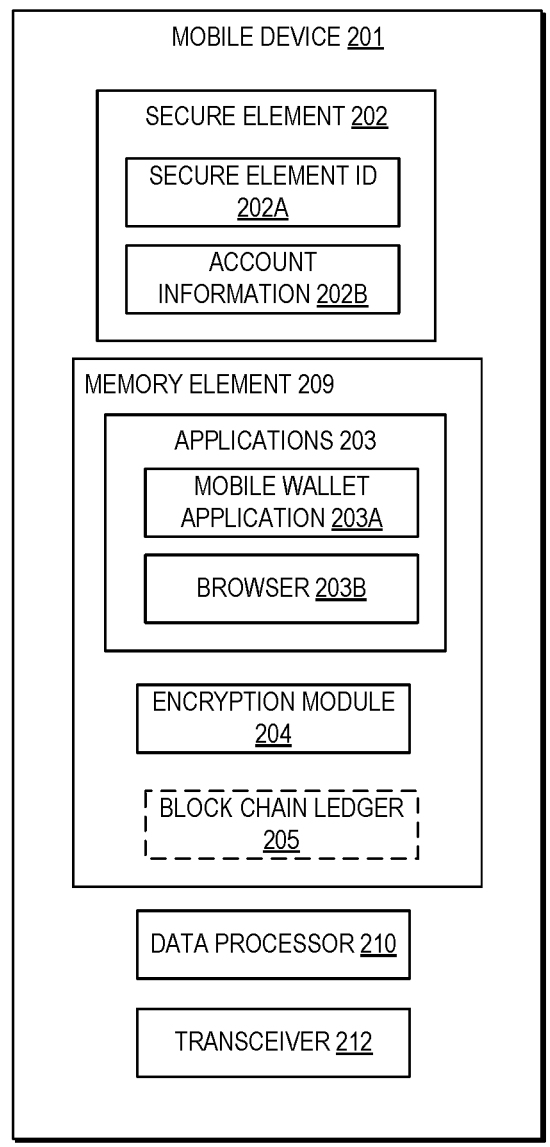
FIG. 2 illustrates a block diagram of an exemplary mobile device according to an embodiment.

FIG. 2 depicts a block diagram of an exemplary mobile device 201 according to an embodiment. FIG. 2 shows a number of components, and the mobile device 201 according to some embodiments may comprise any suitable combination or subset of such components. The first mobile device 101A and the second mobile device 101B depicted in FIG. 1 may include some or all of the components of the mobile device 201 shown in FIG. 2. The mobile device 201 shown in FIG. 2 may comprise a data processor 210, secure element 202, a memory element 209 storing applications 203, encryption module 204, and block chain ledger 205, and a transceiver 212 for allowing the mobile device 201 to send and receive data. The data processor 210 may be operationally coupled to the transceiver 212, the memory element 209, and the secure element.

The secure element 202 may be a storage location on the mobile device 201 capable of storing sensitive data (e.g., secure applications and credentials). Secure element 202 can be, for example, a tamper-resistant platform that is capable of securely hosting applications and their confidential and cryptographic data (e.g. key management). It may also have its own data processor. The secure element 202 may be a secure memory on the mobile device 201 such that the data contained on the secure element 202A cannot easily be hacked, cracked, or obtained by an unauthorized entity. In some embodiments, the secure element 202 may include a secure element identifier 202A and provisioned account information 202B stored on the secure element 202. The secure element identifier 202A may be a unique identifier for the secure element of the mobile device 201. The provisioned account information 202B may include sensitive data associated with an account (e.g., a financial account), including an account identifier and/or a payment token.

The secure element 202 may store information including financial information, bank account information, credit, debit, or prepaid account information (or payment tokens associated with such credit, debit, or prepaid account information), account balance information, expiration dates, verification values such as CVVs or dCVVs, etc. Other information that may be stored in the secure element 202 may include consumer information such as name, date of birth, etc. In other embodiments, some or all of the foregoing information may be stored at a remote server computer (e.g., in the cloud).

In some embodiments, the secure element 202 may be either embedded in the handset of the mobile device 201 or in a subscriber identity module (SIM) card that may be removable from the mobile device 201. The 201A can also be included in an add-on device such as a micro-Secure Digital (micro-SD) card or other portable storage device.

It should be noted that although mobile device 201 has been described as including a secure element, in some embodiments, a mobile device may not have a secure element 202, and the information described above can be stored in a memory of the mobile device 201 that is not part of a secure element 202.

It such embodiments, card emulation techniques such as host card emulation (HCE) can be used to emulate a smartcard on the mobile device 201. In the card emulation environment, a mobile application can access the contactless interface (e.g., a near-field communication (NFC) transceiver) of the mobile device 201 via the operating system (OS) without involving a secure element. Without the requirement that a secure element be present, account credentials may be stored in a memory of the mobile device 201 that is not part of a secure element, such as the general memory of the mobile device 201. As such, the account credentials may be susceptible to access by malware or viruses that may have infected an application or operating system of the mobile device 201.

To enhance the security of the mobile device 201 when conducting transactions without utilizing a secure element, instead of using stagnant account credentials which may be valid for the lifetime of an account, cloud-based payments techniques may provision the mobile device 201 with limited-use account parameters that have a limited usage or lifespan. When the limited usage or lifespan of the limited-use account parameters is exhausted, the same set of limited-use account parameters may no longer be used to conduct further transactions. In order to conduct further transactions using the mobile device 201, new limited-use account parameters may be replenished to the mobile device 201.

The limited-use account parameters provided to the mobile device 201 can be renewed or replenished from the cloud repeatedly during the lifetime of an account. Each time the limited-use account parameters are replenished, device fingerprinting techniques (e.g., a device identifier) can be used to authenticate the mobile device 201. The limited-use account parameters may include a limited-use key (LUK) and information pertaining to the generation of the limited-use key (e.g., time information indicating when the LUK was generated, a counter indicating how many times the LUK has been renewed), as well a token that is used as a substitute for an account identifier. During a transaction, the mobile payment application can utilize the LUK to generate a transaction cryptogram that is used by an issuer or payment processor to validate the transaction. Further descriptions can be found in U.S. Published Patent Application No. 2015/0178724, by Ngo et al., which is herein incorporated by reference in its entirely and is assigned to the same assignee as the present application.

The applications 203 included in the mobile device 201 may be stored in a memory element 209. The memory element 209 may be present within a body of the mobile device 201 or may be detachable from the mobile device 201. In some embodiments, it may be a secure data storage area, which may be similar to or the same as the secure element 202. The applications 203 may be computer code or other data that may be executable by a processor to perform operations. The applications 203 stored in the memory element may include a mobile wallet application 203A or a payment application, and may include a browser application 203B. The server computer 110A may send and receive over-the-air (OTA) messages to a mobile wallet application 203A stored on the mobile device 201. The applications 203 may operate on the mobile device 201 to provide a user interface for user interaction (e.g., to enter and view information).

In some embodiments, the mobile wallet application 203A may generate and/or provide a payment token that is associated with sensitive data (e.g., account information). For example, the token service module 132 may generate a payment token that can be used as a substitute for a real account identifier (e.g., a Primary Account Number (PAN) of an account).

Mobile device 201 can also include an encryption module 204. Encryption element 204 can store token encryption information regarding the payment tokens owned by a user of the mobile device 201. Further, encryption module 204 can store encryption information (e.g., encryption keys and encryption algorithms) for payment tokens generated from tokens belonging to the user of the mobile device 201. Suitable encryption algorithms may include DES, triple DES, AES, etc.

In the event the block chain is made publicly available and is stored as a decentralized ledger, between specific machines, or within a mesh network, the mobile device 201 can also include a block chain ledger 205. Therefore, in some cases, each device or node in the network can store the information regarding the block chain. The block chain ledger 205 can store information regarding transactions in a block chain. An exemplary block chain is further described with respect to FIG. 5.

Figure 3:
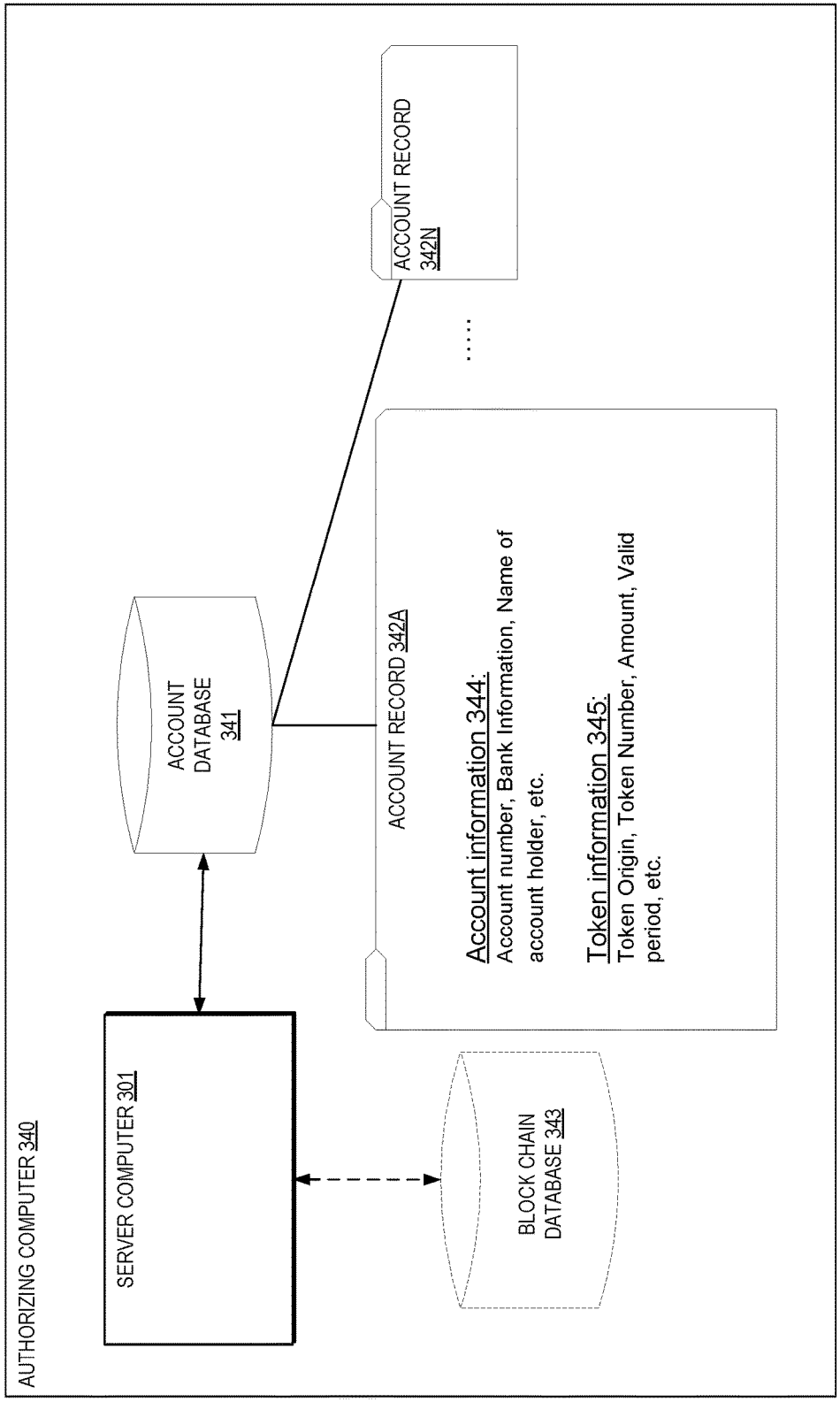
FIG. 3 illustrates an issuer computer managing token accounts, according to an embodiment.

FIG. 3 illustrates a block diagram of a server computer 301 and an account database 341 of an authorizing computer 340 (e.g., an issuer computer), according to some embodiments. Authorizing computer 340, server computer 301, and account database 341 can correspond to, for example, authorizing computer 140, server computer 140A and account database 141 of FIG. 1, respectively.

As shown in FIG. 3, account database 341 can store a plurality of account records 342A to 342n. Each of the plurality of records can store account information 344 and corresponding payment token information 345 for a particular token.

Account information 344 can correspond to, for example, a user's bank account information for a particular bank or can correspond to, for example, a Primary Account Number (PAN) of an account, such as a credit card account. The token information 345 can include information regarding a payment token such identification information, amount, valid date and time, and its origin, such as whether it is a derivative of another token. Therefore, the token information in the account record for the second payment token can include a specific number combination that indicates that the second payment token is a derivative of the first payment token. For example, a last number in a 16 digit number can be used to identify whether a payment token is a derivative of a previous token.

In addition to or alternatively, the token information in the account record for the second payment token can include metadata that includes derivative information. For example, the metadata can indicate that the second payment token is a derivative of, for example, the first payment token. For every payment token that is generated and can be sufficiently funded, a corresponding account record 342N can be generated for the payment token.

In some embodiments, if a user (e.g., Alice) were to create a second payment token based off of a first payment token that was previously generated, the authorizing computer 340 can determine whether the second payment token was generated by a valid user and if the user had sufficient funds in the first payment token to fund the second payment token (e.g., second payment token to be send to, for example, Bob). Therefore, the first payment token acts, for example, as a prepaid card and the second payment token acts as a prepaid card based off of the first payment token.

If, for example, the user (e.g., Alice) that has generated the second payment token has sufficient funds in the first payment token to fund the second payment token, then the authorizing computer 340 can generate a second account including information regarding the second payment token. The information regarding the second account directed to the second payment token can be stored in, for example, another account record (e.g., account record 342N). In the event the user does not have sufficient funds in the first payment token to fund the second payment token, then the user can be notified that they do not have sufficient funds to create a second payment token when either the first mobile device 101A or the second mobile device 101B goes online. The user can then determine how to proceed, such as by changing the amount for the second payment token, or deciding not to proceed with the creation of the second payment token.

Therefore, as soon as either the first mobile device 101A or the second mobile device 101B goes online or establishes an Internet connection, the second payment token can be verified and validated. If the second payment token is verified and validated, the amount of the second payment token can be withdrawn from the account corresponding to the first payment token and the record for the second payment token can be updated to indicate a deposit of funds. Therefore, the transfer of funds can be immediate, or it could happen a later time. However, if the second payment token cannot be verified and validated, then the funds will not be transferred to the account for the second payment token.

In some embodiments, the payment tokens can be associated with a PAN and a corresponding account. Therefore, the funds can be withdrawn and deposited according to verification and validation performed for a credit card or debit card transaction.

The process can proceed similarly if a third transaction were to occur. A third payment token can be generated from the second payment token or a third payment token can be generated from the first payment token. This process may be repeated as many times as desired.

In the event the block chain is not made publicly available, for example, if each of a plurality of mobile devices in the system 100 does not maintain a ledger of token payment transactions, then the block chain information can be stored by, for example, the authorizing computer 340 in a block chain database 343. Although the block chain database 343 is shown stored with the authorizing computer 340, the block chain information can be stored separate from the issuer computer 340 and can be stored in, for example, a cloud environment. In such embodiments, the block chain and any corresponding ledger would only be stored by trusted computers.

In the event the block chain 500 is only accessible to, for example, an issuer such as an issuer operating the authorizing computer 340, then the issuer can look to the block chain information stored in block chain database 343 to determine whether to authorize a transaction. For example, the authorizing computer 340 can look at the block chain to determine whether a payment token was generated by an authorized device and if the payment token is funded by sufficient funds.

II. Methods

Figure 4:
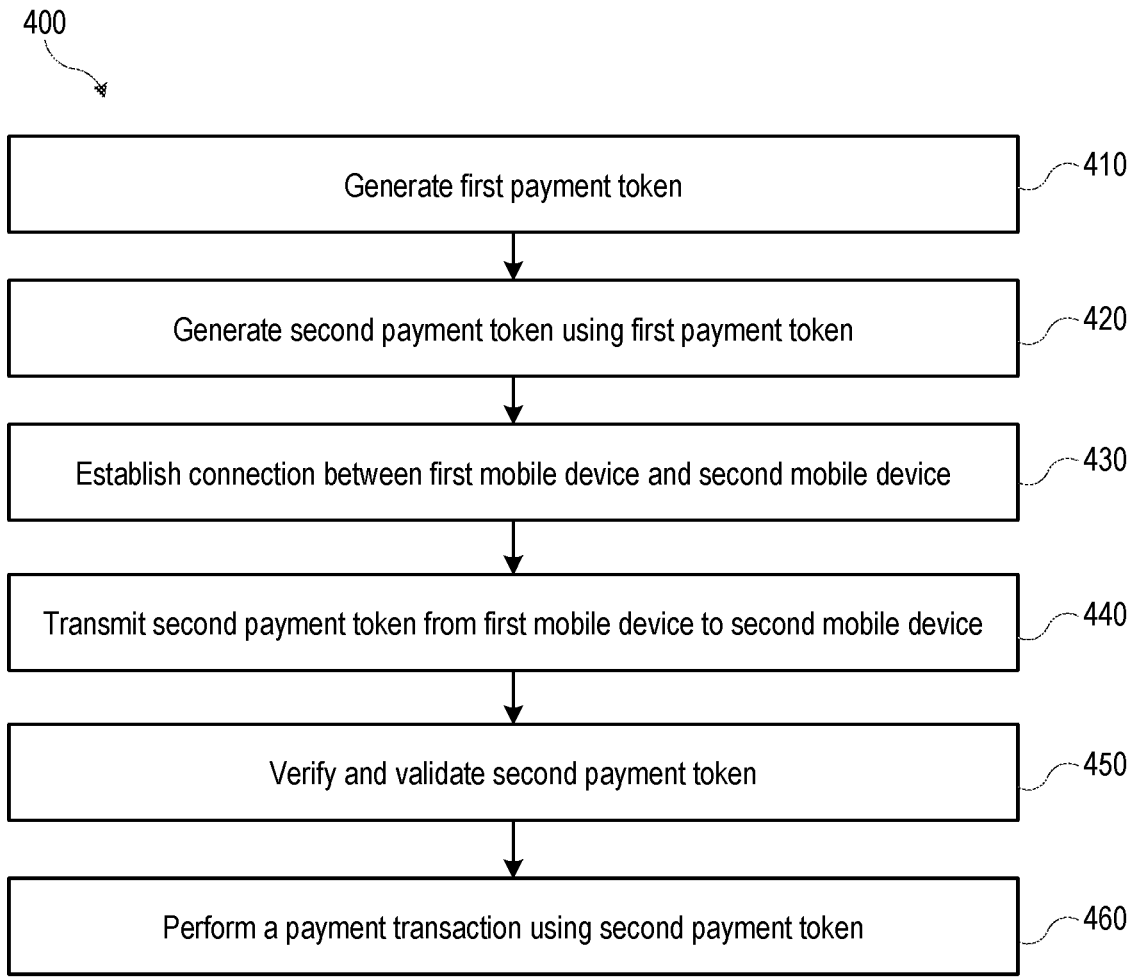
FIG. 4 illustrates a flowchart of a method for generating and provisioning a payment token from a first mobile device to a second mobile device using a provisioning system according to an embodiment.

FIG. 4 is an overview of a method 400 for generating and provisioning a payment token from a first mobile device to a second mobile device using a provisioning system 100 according to an embodiment.

At step 410, a first payment token is obtained by the first mobile device 101A. The first mobile device 101A is online at this time. The second mobile device 101B may be online or offline at this time.

As discussed above, a token can be generated by, for example, token service module 132. Token service module 132 can facilitate requesting, determining (e.g., generating) and/or issuing tokens, as well as maintaining an established mapping of tokens to primary account numbers (PANs) in a repository (e.g. token vault 133).

The first mobile device 101A can send a token request message, which may be an electronic message for requesting a token, to the token service module 132. A token request message may include information usable for identifying an account or digital wallet, and/or information for generating a token. For example, a token request message may include one or more of the following: credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, a token request message may be formatted as an authorization request message (e.g., an ISO 8583 message format). In some embodiments, the token request message may include a flag or other indicator specifying that the message is a token request message.

The token service module 132 can reply to the first mobile device with a token response message which may be a message that responds to a token request. A token response message may include an indication that a token request was approved or denied. A token response message may also include one or more of: a token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). In some embodiments, the token response message may include a flag or other indicator specifying that the message is a token response message.

At step 420, the first mobile device 101A can generate a second payment token using the first payment token that was obtained in step 410. In an exemplary embodiment, the first mobile device 101A and the second mobile device are offline at this time.

At step 430, a connection is established between the first mobile device 101A and the second mobile device 101B. The connection may be a local area connection and may utilize any suitable short range communication technology including Bluetooth™, RF, mesh networking, IR, etc. In an exemplary embodiment, the first mobile device 101A and the second mobile device 101B are offline at this time in the sense that they are not in communication with a remote server computer such as the server computer 130 in the processing network 120.

At step 440, the second payment token that was generated by the first mobile device 101A at step 420 can be transmitted to the second mobile device 101B. In an exemplary embodiment, the first mobile device 101A and the second mobile device 101B are offline at this time.

At step 450, the second payment token that was transmitted to the second mobile device 101B is verified and validated. In an exemplary embodiment, either the first mobile device 101A or the second mobile device 101B has gone online, and therefore, verification and validation of the second payment token can be performed.

At step 460, a user of the second mobile device 101B can use the second payment token received from the first mobile device 101A to perform a payment transaction.

Although the embodiment in FIG. 4 is described with respect to, for example, mobile device 101A and 101B, any mobile device can be used to perform the operations described above.

Further, the steps of the method can be implemented in the system of FIG. 1, as discussed in more detail below.

Additional methods and processes may be included within these methods and may be recognized by one of ordinary skill in the art, in light of the description below. Further, in some embodiments, the described methods may be combined, mixed, and matched, as one of ordinary skill would recognize. Further, one or more steps may be omitted or one or more steps may be added without departing from the invention.

The embodiment described below describes the use of mobile devices. Other embodiments include the use of other types of computing devices that are capable of storing and utilizing a mobile wallet application and accessing a wallet provider computer 110.

At step 1, a first payment token is generated and provisioned on a first mobile device 101A. In some embodiments, the first payment token may be generated in response to a payment token request message made using a mobile wallet application 203A stored on the first mobile device 101A. The mobile wallet application 203A may be associated with a service provider computer 110. The mobile wallet application 203A may be stored on a secure element 202 in the first mobile device 101A and able to communicate with the service provider computer 110 via a network communications channel (e.g., the Internet). The payment token request message may include an amount of funds requested by the first user 102A to be provisioned to the first mobile device 101A.

The payment token request message may be sent to the service provider computer 110 and a payment processing network 120. The processing network 120 may evaluate the payment token request message and retrieve account information for an account associated with the first user 102A. The processing network 120 may generate the first payment token using the account information. The processing network 120 may use a token service module 132 to generate the first payment token. In some embodiments, the token request message may also be sent to an authorizing computer 140 associated with the account of the first user 102A. The authorizing computer 140 may determine whether the first user 102A has sufficient funds in their account to satisfy the amount requested in the payment token request message. When the authorizing computer 140 determines that there are sufficient funds for the payment token request, the first payment token may be associated with the amount of funds requested by the first user 102A.

In some embodiments, a copy of the first payment token and/or data regarding the first payment token may be stored in a token vault 133. The data regarding the first payment token stored in the token vault 133 may be accessed when the first payment token is used in a transaction to retrieve the actual account information associated with the first payment token.

As noted above, the first user 102A may request an amount to be associated with the first payment token. The amount associated with the first payment token may be based on the available balance of funds in the financial account of the first user 102A. For example, first payment token, "4900 1233 0000 0001," may be generated with a value of $100. The payment token may be sent to the first mobile device 101A by the payment processing network and the service provider computer 110 120 and stored in the secure element 202 in the first mobile device 101A.

In alternative embodiments, where the first mobile device 101A does not have a secure element, the first payment token may be generated by and stored in the cloud (e.g., a combination of software and one or more server computers connected to each other). In such embodiments, the first user 102A may access the software and hardware in the cloud using the mobile wallet application 203A stored on the first mobile device 101A.

At step 2, a second payment token may be generated on the first mobile device 101A using the mobile wallet application 203A. The second payment token may be generated from the first payment token, and the second payment token may have a partial value or a full value associated with the first payment token. In some embodiments, the first user may establish one or more limits on the usage of the second payment token, including, but not limited to: value amount, start date when the value amount associated with the second payment token may be accessible/available for use, and a personal note/memo). For example, a second payment token, "4900 1233 0000 0002," may be generated with a value amount of $50, and the first user 102A may specify that the second payment token becomes valid starting on Jan. 25, 2015. The data for the second payment token may be stored in the token vault 133 when one of the first mobile device 101A and the second mobile device 101B goes online, as described below.

In some embodiments, the second payment token may also include or be associated with a data field containing information associated with the first payment token and the first mobile device 101A. This information stored in the data field may include a device identifier, a user identifier, a phone number associated with the first mobile device 101A, and/or any other comparable unique device data. The storage of the unique device data for the first mobile device 101A may allow the second payment token to be traced back to the mobile device of origin (e.g., the first mobile device 101A) for verification and validation purposes (e.g., to ensure that the second payment token is a legitimate payment token).

The information associated with the payment tokens may also be stored in a block chain (e.g., a distributed, public data structure) that may be accessible by a plurality of mobile devices and computing devices. A block chain can be a transaction database that can be shared with all participating devices (e.g. first mobile device 101A and second mobile device 101B) in the system such as in system 100. The block chain 500 can be stored so that it is available only to for example, an issuer or the block chain 500 can be made publicly available, such that the block chain 500 is stored in, for example, a public ledger. In other embodiments, the ledger may be private to only secure parties in the system.

Figure 5:
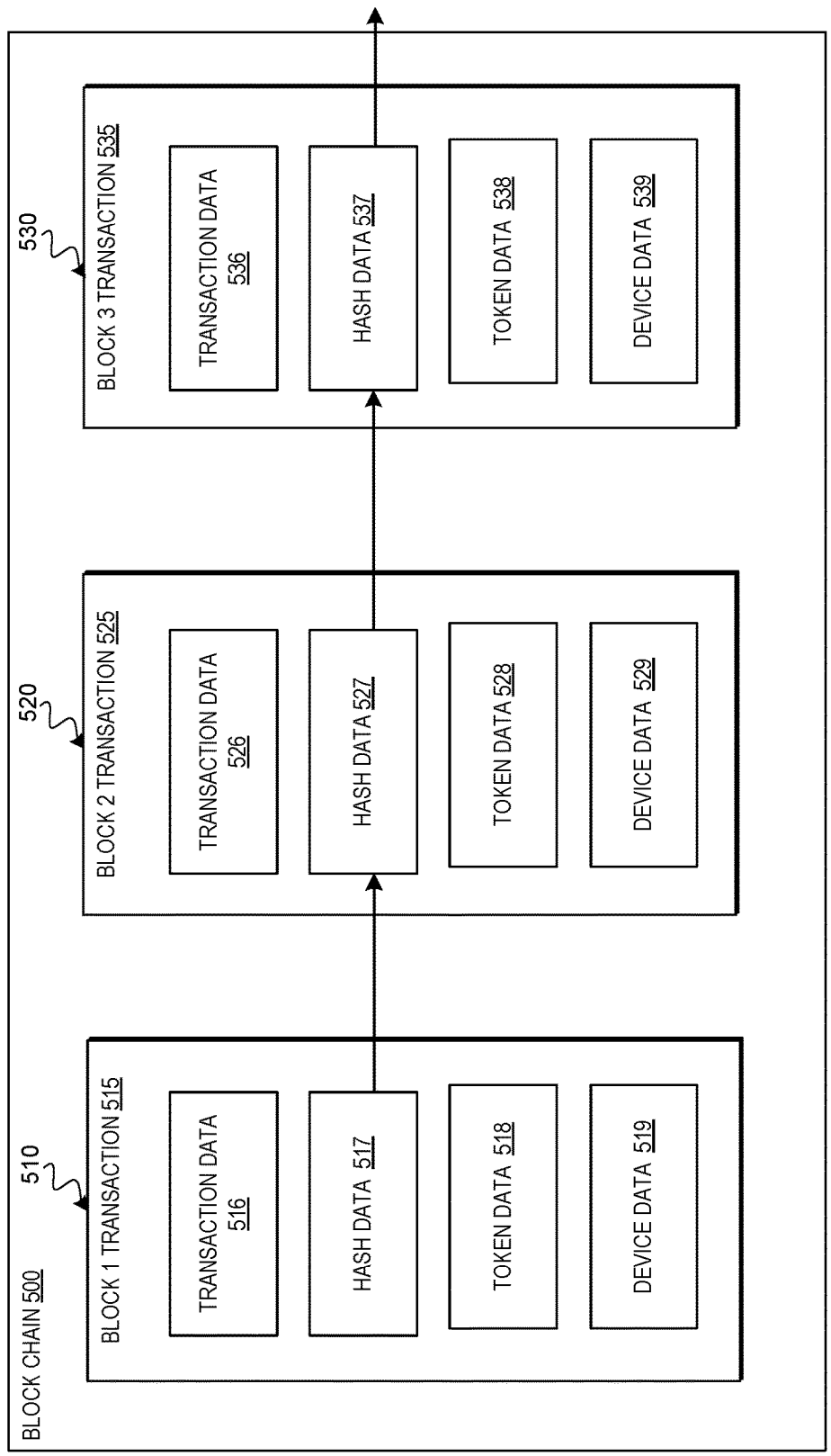
FIG. 5 illustrates a block chain for verifying transactions according to an embodiment.

FIG. 5 illustrates a block chain 500 for verifying transactions according to an embodiment. The block chain 500 may be comprised of a plurality of blocks, with each block containing information regarding one or more transactions and a hash of at least some of the information in the previous blocks in the chain. In some embodiments, the block chain 500 may include an entry for every payment token generated and/or associated with the mobile wallet application 203A.

Block chain 500 can include a plurality of blocks (e.g., data recorded in files) such as a first block 510, a second block 520 and a third block 530. The blocks 510, 520, and 530 record and confirm transactions and the sequence of transactions. Each of the plurality of blocks 510, 520 and 530 can include transaction information such as information regarding all transactions in the block, information regarding a recent transaction, or information regarding a transaction in a block immediately before a current block. As shown in FIG. 5, first block 510 corresponds to a block 1 transaction 515, second block 520 corresponds to a block 2 transaction 525, and third block 530 corresponds to a block 3 transaction 535.

First block 510 can include transaction data 516, hash data 517, token data 518 and device data 519. The transaction data 516 can include information regarding a type of transaction, the monetary value of the transaction, time and day information etc. The hash data 517 can include hash information regarding a payment token corresponding with the block 1 transaction. Token data 518 can include payment token information, and device data 519 can include information regarding one or more devices involved in the transaction of first block 510. The information in first block 510 can correspond to, for example, first token generation data.

Second block 520 can include transaction data 526, hash data 527, token data 528 and device data 529. The transaction data 526 can include information regarding a type of transaction, the monetary value of the transaction, time and day information etc. The hash data 527 can include hash information regarding a payment token of a previous block (e.g., the first block 510). Token data 528 can include payment token information, and device data 529 can include information regarding one or more devices involved in the transaction of second block 520. The information in second block 520 can correspond to, for example, second token generation data.

Third block 530 can include transaction data 536, hash data 537, token data 538 and device data 539. The transaction data 536 can include information regarding a type of transaction, the monetary value of the transaction, time and day information etc. The hash data 537 can include hash information regarding a payment token of a previous block (e.g., the second block 520). Token data 538 can include payment token information, and device data 539 can include information regarding one or more devices involved in the transaction of third block 530. The information in third block 530 can correspond to, for example, third token generation data.

Although three blocks are shown in FIG. 5, this is merely an example and a block can include any number of blocks corresponding to a plurality of different transactions. In some embodiments, by using a block chain, such as block chain 500, double spending (e.g. spending a monetary value more than once that can result in conflicting transactions) can be prevented. Each transaction is verified before it is added to the block chain 500. Therefore, if the monetary value does not exist, then the transaction will not be added to the block chain 500. In addition, the first token generation data, the second token generation data and the third token generation data can be used by any of the mobile devices in the system to verify the origin of a token (e.g., first token, second token, third token, etc.).

As shown in FIG. 5, the first block 510 may be generated for the first payment token. The first block 510 in block chain 500 may include information regarding the first payment token in token data 518 and information regarding the first mobile device 101A in device data 519.

The second block 520 in the block chain 500 may be generated for the second payment token. The second block 520 may be appended to the first block 510 and include a hash of the data contained in the first block 510. The hash of the data contained in the first block 510 can be located in hash data 527. The second block 520 may also include identifying information for the second payment token that can be located in token data 528. The identifying information for the second payment token can include a value amount and the start date when the value amount associated with the second payment token may be accessible/available for use by the second user 102B. The entry in the block chain 500 for the second payment token (e.g., second block 520) may also include identifying information for the mobile device upon which the second payment token was generated (e.g., the first mobile device 101A in this example). The identifying information may be an example of "second token generation data". Further, the second block 520 can include information regarding the mobile device upon which the second payment token was provisioned (e.g., the second mobile device 101B). The identifying information can be stored in device data store 529. The entry in the block chain may also have identifying information for the first payment token from which the second payment token was spawned. The token information can be stored in token data store 528.

If block chain 500 is publicly accessible and distributed, by adding this data in the publicly accessible and distributed block chain 500, this allows all other devices to identify the genesis device or origin device that generated the second payment token, as well as the first payment token from which the second payment token was generated.

Alternatively, the block chain 500 can be made accessible only to, for example, designated users or groups, such as issuer. Further, although the block chain shown in FIG. 5 is sequential, the chain may include branches or forks in the chain. For example, if the first payment token is additionally used to create a fourth payment token, then there may be another block branching from the first block 510.

In some embodiments, the entry for the second payment token may be pushed only to a particular second mobile device. In some embodiments, when the first mobile device 101A and the second mobile device 101B are offline (e.g., not connected to the Internet), the entry for the second payment token may be pushed to all mobile devices on a same personal area network as the first mobile device 101A and the second mobile device 101B. The other mobile devices may receive the entry for the second payment token when they also have the mobile wallet application 203A. When either the first mobile device 101A or the second mobile device 101B go online, additional mobile devices and computing devices may receive the entry for the second payment token, in addition to the processing network 120.

In some embodiments, the second payment token may be generated in the cloud. In such embodiments, the first user 102A may access the cloud using the mobile wallet application 203A stored on the first mobile device 101A. In such embodiments, the software and hardware in the cloud (e.g., the collection of software and server computers) may generate the second payment token. The second payment token may then be stored in the cloud.

In such embodiments, instead of sending the second payment token from the first mobile device 101A to the second mobile device 101B, the first mobile device 101A may send a payment token generation message to the second mobile device 101B. The second payment token may then be accessible by the second mobile device 101B when the second user 102B performs a transaction using the second mobile device 101B and provides the payment token generation message. In this scenario, when the processing network 120 receives the payment token generation message, it may determine that the second payment token was previously generated and may then apply the second payment token to the transaction.

At step 3, a connection is established between the first mobile device 101A and a second mobile device 101B. The connection may be a personal area network connections (e.g., a Bluetooth™, near-field communications (NFC), or any comparable communications) connection that allows for the transmittal of data between the first mobile device 101A and the second mobile device 101B. In some embodiments, one or both of the first mobile device 101A and the second mobile device 101B may be offline (e.g., not connected to a local area network, Wi-Fi, or cellular network) while connected via the personal area network connection.

At step 4, the second payment token is transmitted from the first mobile device 101A to the second mobile device 101B. In some embodiments, the second payment token is transmitted from the first mobile device 101A to the second mobile device 101B using the personal area network connection. In some embodiments, the second payment token may be transmitted to the second mobile device 101B automatically when the first mobile device 101A and the second mobile device 101B are moved to within a specific range of each other. In some embodiments, the second payment token may be sent to the second mobile device 101B in a text message or email.

In some embodiments, the second payment token could be encrypted by the first mobile device 101A before it is transferred to the second mobile device 101B. The second mobile device 101B could then decrypt the encrypted second payment token, if it stores the corresponding encryption key. The encryption information can be stored in, for example, encryption element 204. In yet other embodiments, a digital message could be provided from the first mobile device 101A to the second mobile device 101B, and the second device 101B could use this to verify the source of the second payment token.

Figure 6:
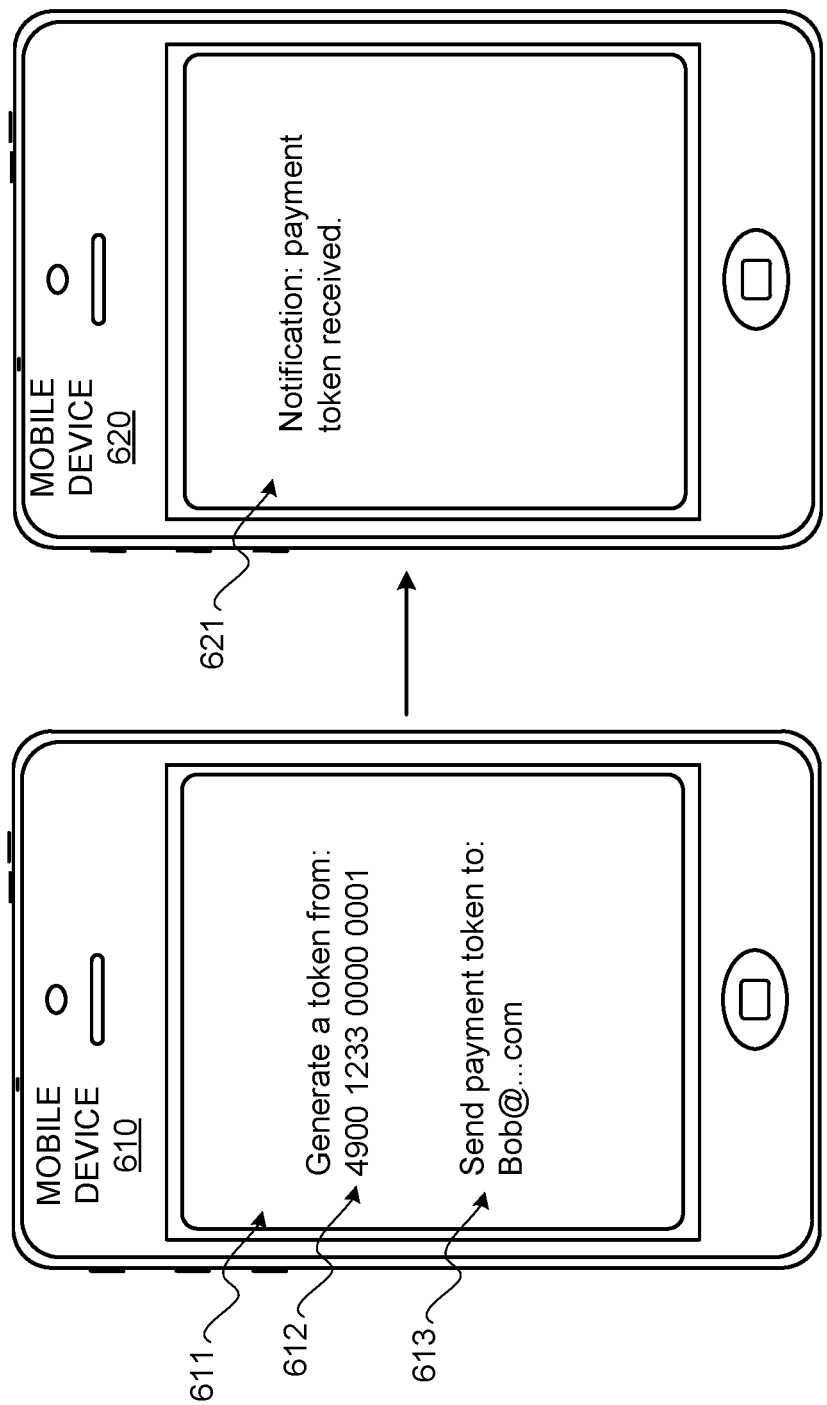
FIG. 6 illustrates user interfaces for a first mobile device and a second mobile device during transmission of a second token from the first mobile device to the second mobile device according to an embodiment.

FIG. 6 illustrates user interfaces of a first mobile device 610 and a second mobile device 620 during transmission of a second payment token from the first mobile device 610 to the second mobile device 620.

As shown in display 611, a user of the first mobile device 610 can indicate account information 612 for a first payment token from which the second token is to be generated and recipient information 613 of the first payment token.

After the user of the first mobile device 610 has confirmed they would like to proceed with the transaction, the user of the second mobile device 620 can receive a notification that they have received a payment token. The user of the second mobile device 620 can then proceed to accept the payment token. When either the first mobile device 610 or the second mobile device goes online, it can be determined whether the second token is sufficiently funded.

Therefore, the second payment token can be generated and provisioned to a second mobile device while the first mobile device, which generated the second token, and the second mobile device, which receives the second payment token, are offline. For example, the second payment token can be generated and provisioned while the first mobile device and the second mobile device are in an area that does not have Internet access, such as while underground on a subway.

At step 5, the second payment token is verified and validated when one of the first mobile device 101A and the second mobile device 101B goes online (e.g., connects to the Internet).

The second payment token may be verified by a token service (e.g., a service provider computer 110 and/or a processing network 120) using the data field and registered to the second device. In some embodiments, when one of either the first mobile device 101A or the second mobile device 101B has Internet accessibility, the service provider computer 110 may be accessed and provided with the information associated with the second payment token including the information in the data field. The second payment token may then be validated by the service provider computer 110, and registered for use by the second mobile device 101B in a payment transaction. The validation process by the service provider computer 110 may include updating a record of the first payment token stored at the service provider computer 110 and/or the processing network 120. In addition, a record (e.g., account record 242N) may be generated for the second payment token, including the parameters for the second payment token (e.g., the value amount, the starting date for the validity of the second payment token).

In some embodiments, a copy of the second payment token and/or data regarding the second payment token may be stored in the token vault 133. The data regarding the second payment token may be stored in the token vault 133 and may be accessed when the second payment token is used in a transaction to retrieve the actual account information associated with the second payment token.

In some embodiments, where the second payment token may be generated in the cloud and the first mobile device 101A and the second mobile device 101B are offline, an encrypted payment token generation message may be generated and stored on either the first mobile device 101A or the second mobile device 101B. In such embodiments, when either the first mobile device 101A and the second mobile device 101B goes online, the encrypted payment token generation message may be transmitted to the cloud by the mobile wallet application 203A to generate and validate the second payment token.

In some embodiments, the payment token generation message to generate the second payment token may be sent when the second user 102B performs a transaction with the second mobile device 101B. In such embodiments, the payment token generation message may be sent by a merchant device (e.g., POS device) to the processing network 120. The processing network 120 may then validate the payment token generation message and request the second payment token be generated from the first payment token by the token service module 132.

At step 6, when the second payment token is verified and validated, the second payment token may be used by the second user to perform a payment transaction with a merchant. In some embodiments, the second payment token may be used as a prepaid account or prepaid payment device for a payment transaction, or the value of the second payment token may be deposited into a financial account. In some embodiments, the value of the second payment token may be available for use by the second user once the funds availability starting date is reached. Using the example above, the second payment token "4900 1233 0000 0002" may be valid starting Jan. 25, 2015.

In such embodiments, when the second user presents the second payment token for use in a payment transaction with a resource provider computer 150, the second payment token may be validated by evaluating the entry for the second payment token stored in the public register. For example, the origin of the second payment token may be traced back to the first mobile device 101A and the first payment token associated with the first mobile device 101A.

In some embodiments, the public register may also be updated with the new value amount for the second payment token reflecting the payment transaction performed by the second user.

In a more specific payment process, the resource provider computer 150 may generate an authorization request message comprising the second payment token, and it may be transmitted to the processing network 120 (e.g., via an acquirer computer, not shown). In some embodiments, the processing network 120 receives the authorization request message with the second payment token and may verify the second payment token and determine if it is or is not valid. If it is, then the authorization request message may be forwarded to the authorizing computer 140. The authorizing computer 140 may receive the authorization request with the second payment token and may also verify and validate the second payment token (as described above). If it is valid, then the authorizing computer 140 may authorize the transaction if there are sufficient funds in the second payment token account to fund the transaction. If an account has not been set up for the second payment token and if the funds are to be drawn from the account associated with the first payment token, then the authorizing computer 340 may determine the first token from the second token, and may determine the real account information from the first token. The real account may then be checked to determine if there are sufficient funds to fund the transaction, and an authorization response message may be transmitted back to the resource provider computer 150 via the processing network 120.

At the end of the day or at any other suitable period of time, a clearing and settlement process between an acquirer, the processing network 120, and the authorizing computer 140 may be performed. In yet other embodiments, the settlement of funds may occur using OCT (original credit transaction) and AFT (automated funding transactions).

In some embodiments, additional tokens may be generated. For example, the above-described second payment token may be later used to generate a third payment token (e.g., "4900 1233 0000 0003"). For example, the second user may use the mobile wallet application 203A stored on the second mobile device 101B to generate a third payment token for $20 to be sent to a third mobile device. In such embodiments, the data field for the third payment token may include the device identifier, a user identifier, a phone number, and/or any other comparable unique device data associated with both the first mobile device 101A and the second mobile device 101B. The storage of the unique device data for the first mobile device 101A and the second mobile device 101B, and identifying information for the first payment token and the second payment token may allow the third payment token to be traced back to the mobile device of origin (e.g., the first mobile device 101A) and the payment token of origin for verification and validation purposes to ensure that the third payment token is a legitimate payment token.

Embodiments may provide greater protection and security for payment tokens. By storing the identifying information for mobile devices (e.g., device identifiers) associated with a payment token, the origin of a payment token may be traced back to a first mobile device at which the payment token was generated (and an earlier payment token that it may have been provisioned from). This allows the history of the payment token to be evaluated and verified. Further, it can be easily determined whether a token is a derivative or is based off of another token.

In addition, by storing the identifying information for each payment token in a public register or public ledger, payment tokens may be validated and verified by other mobile devices. As other devices on a local network (e.g., a mesh network) may be able to obtain information regarding the payment token even when not connected to the Internet, this allows the validation and verification process to be conducted even when the mobile device storing the payment token is offline.

The various participants and elements described herein may operate one or more computer apparatuses to facilitate the functions described herein. Any of the elements in the above-described FIG. 1, including any servers or databases, may use any suitable number of subsystems to facilitate the functions described herein. The subsystems can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may be embodied by a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the embodiments may become apparent to those skilled in the art upon review of the disclosure. The scope of the embodiments can, therefore, be determined not with reference to the above description, but instead can be determined with reference to the pending claims along with their full scope or equivalents.

One or more features from any embodiment may be combined with one or more features of any other embodiment without departing from the scope.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
obtaining, by a first mobile device, a first token of a digital wallet stored on a secure element of the first mobile device, the first token associated with an amount of funds and a funds availability starting date;
storing, by the first mobile device, the first token associated with the amount of funds and the funds availability starting date;
receiving, by the first mobile device, a request to generate a second token for a second mobile device;
sending, by the first mobile device to an authorizing computer, a request to generate the second token that is associated with a second amount of funds that is within the amount of funds and a second funds availability starting date;
receiving, by the first mobile device from the authorizing computer, authorization to generate the second token in response to the first mobile device having permission to generate the second token, wherein the generation of the second token is authorized when the first token has a sufficient amount of funds for generating the second token;
disconnecting, by the first mobile device, an internet connection of the first mobile device;
generating, by the first mobile device while the internet connection of the first mobile device is disconnected, the second token and second token generation data based on the received authorization, and linking the second token to the first token;
connecting, by the first mobile device, to the second mobile device via a short range wireless connection;
provisioning, by the first mobile device via the short range wireless connection while the internet connection of the first mobile device is disconnected, the second token and the second token generation data to a second digital wallet stored on a second secure element of the second mobile device;
connecting, by the first mobile device, the internet connection of the first mobile device;
obtaining, by the first mobile device, transaction history information from a blockchain containing transaction data associated with the first token and containing transaction data associated with the second token; and
determining, by the first mobile device, that the second token and second token generation data has been provisioned to the second mobile device based on the obtained transaction history information.

2. The method of claim 1, wherein the second mobile device is offline during the generating of the second token linked to the first token and the second token generation data, and during the provisioning of the second token and the second token generation data to the second mobile device.

3. The method of claim 1, wherein the second token generation data comprises a hash of at least one of the first token and a first device identifier.

4. The method of claim 1, wherein the second token generation data identifies that the second token is a derivative of the first token.

5. The method of claim 1, further comprising verifying that the first mobile device has provisioned the second token to the second mobile device according to transaction information in the blockchain.

6. The method of claim 5, wherein in response to verifying that the first mobile device has provisioned the second token to the second mobile device, validating the second token.

7. The method of claim 5, wherein the blockchain comprises a plurality of blocks, and each of the plurality of blocks corresponds to a plurality of token transactions.

8. The method of claim 7, wherein one of the plurality of token transactions comprises transmission of the second token from the first mobile device to the second mobile device.

9. The method of claim 5, wherein the blockchain is a decentralized ledger that is stored in the first mobile device and the second mobile device.

10. The method of claim 5, wherein the blockchain is a private ledger that is accessible to the authorizing computer.

11. The method of claim 5, wherein the transaction information comprises account information, device information, and token information of a plurality of blocks in the blockchain.

12. The method of claim 1, wherein the second token comprises derivative identifying data.

13. The method of claim 12, wherein the derivative identifying data comprises metadata associated with the second token.

14. A first mobile device comprising:
one or more processors;
a secure element; and
a memory coupled to the one or more processors, the memory comprising code that when executed by the one or more processors causes the one or more processors to implement a method comprising:
obtaining a first token of a digital wallet stored on the secure element of the first mobile device, the first token associated with an amount of funds and a funds availability starting date;
storing the first token associated with the amount of funds and the funds availability starting date;
receiving a request to generate a second token for a second mobile device;
sending, to an authorizing computer, a request to generate the second token that is associated with a second amount of funds that is within the amount of funds and a second funds availability starting date;
receiving, from the authorizing computer, authorization to generate the second token in response to the first mobile device having permission to generate the second token, wherein the generation of the second token is authorized when the first token has a sufficient amount of funds for generating the second token;
disconnecting an internet connection of the first mobile device;
generating while the internet connection of the first mobile device is disconnected, the second token and second token generation data based on the received authorization, and linking the second token to the first token;
connecting to the second mobile device via a short range wireless connection;
provisioning via the short range wireless connection the second token and the second token generation data to a second digital wallet stored on a second secure element located on the second mobile device while the internet connection of the first mobile device is disconnected;

connecting the internet connection of the first mobile device;

obtaining transaction history information from a blockchain containing transaction data associated with the first token and containing transaction data associated with the second token; and determining confirmation of the provisioning of the second token and second token generation data to the second mobile device based on the obtained transaction history information.

15. The first mobile device of claim 14, wherein the method further comprises:

verifying that the first mobile device has provisioned the second token to the second mobile device according to information in the blockchain.

16. The first mobile device of claim 14, wherein the method further comprises:

in response to verifying that the first mobile device has provisioned the second token to the second mobile device, validating the second token.

17. The first mobile device of claim 14, wherein the method further comprises:

generating record for the first token and the second token.

18. The first mobile device of claim 14, further comprising a blockchain database storing the blockchain.

19. The first mobile device of claim 18, further comprising a blockchain ledger storing the blockchain.

20. A non-transitory computer-readable storage medium storing a plurality of instructions that when executed by one or more processors causes the one or more processors to perform operations comprising;

obtaining a first token of a digital wallet stored on a secure element of a first mobile device, the first token associated with an amount of funds and a funds availability starting date;

storing the first token associated with the amount of funds and the funds availability starting date;

receiving a request to generate a second token for a second mobile device;

sending, to an authorizing computer, a request to generate the second token that is associated with a second amount of funds that is within the amount of funds and a second funds availability starting date;

receiving, from the authorizing computer, authorization to generate the second token in response to the first mobile device having permission to generate the second token, wherein the generation of the second token is authorized when the first token has a sufficient amount of funds for gene rating the second token;

disconnecting an internet connection of the first mobile device;

generating, by the first mobile device while the internet connection of the first mobile device is disconnected, the second token and second token generation data based on the received authorization and linking the second token to the first token;

connecting to the second mobile device via a short range wireless connection;

provisioning, via the short range wireless connection while the first mobile device is disconnected, the second token and the second token generation data to a second digital wallet stored on a second secure element located on the second mobile device;

connecting the internet connection of the first mobile device;

obtaining transaction history information from a blockchain containing transaction data associated with the first token and containing transaction data associated with the second token; and determining confirmation of the provisioning of the second token and second token generation data to the second mobile device based on the obtained transaction history information.

21. The method according to claim 1, wherein the confirmation of the provisioning of the second token and second token generation data to the second mobile device is determined in response to the first token having sufficient funds to fund the second token.

22. The method according to claim 1, wherein the second token is configured to generate a third token, and wherein the third token is linked to the second token.

23. The method according to claim 1, wherein the first mobile device is offline when it is not connected to a network, and wherein the first mobile device is online when it is connected to the network.

24. The method according to claim 1, wherein the blockchain associated with the first token is publicly available, the method further comprising validating, by a third mobile device, the second token when the first mobile device and the second mobile device are offline.

* * * * *